P. A. McCASKEY.
MULTIPLE CASH RECORDER.
APPLICATION FILED MAY 23, 1908.

1,043,332.

Patented Nov. 5, 1912.

Witnesses:
H. W. Steindorf
Brennan B. West

Inventor
Perry A. McCaskey,
By Bates Foues H Hull
Attys.

UNITED STATES PATENT OFFICE.

PERRY A. McCASKEY, OF ALLIANCE, OHIO.

MULTIPLE CASH-RECORDER.

1,043,332.  Specification of Letters Patent.  Patented Nov. 5, 1912.

Application filed May 23, 1908. Serial No. 434,490.

*To all whom it may concern:*

Be it known that I, PERRY A. MCCASKEY, a citizen of the United States, residing at Alliance, in the county of Stark and State of Ohio, have invented a certain new and useful Improvement in Multiple Cash-Recorders, of which the following is a full, clear, and exact description, reference being had to the accompanying drawings.

This invention relates primarily to cash recording devices, and more particularly to devices of that character in which the various clerks having access to the machine are required to keep separate accounts and to keep funds intrusted to their use and which they receive separate, whereby the proprietor may ascertain by consulting the record strips or sheets the numbers and the amounts of the sales made by each clerk, and may check up with the record strips or sheets the money found in the various cash tills of the clerks.

The object of the invention is, therefore, to provide a machine in which each individual clerk is required to keep a full and complete record of all of his various transactions; in which the moneys intrusted to the respective clerks are kept separate; in which each clerk, after recording the transaction, releases his own individual cash receptacle to the exclusion of all other cash receptacles; in which the various record strips are fed through mechanism operated during the closing movement of its respective cash receptacle; in which an audible indicator is provided for each cash receptacle, said indicators differing in tone from one another, whereby the clerk is enabled to tell, even from a distance, if his cash receptacle has been surreptitiously opened; in which the locking mechanisms for the various cash receptacles are electrically operated through circuits connected with a common source of electrical energy; in which a register or counter is provided for each receptacle in order to show the number of times said receptacle has been operated; in which a special counter is provided for showing how often access has been gained to the recording rolls; in which each record roll is so ruled or graduated as to adapt the same for separating the accounts into classes or departments, such as "cash" accounts, and "paid out" accounts. In combination with the cash recorder I have provided an advertising mechanism which, in part, consists of an endless belt passing over drums and carrying advertising matter, said belt being operated by the cash receptacles during their closing movement, the advertising matter appearing at windows in the casing. Associated with the said belt are interior lights which cause the advertising matter on the belt to appear by transmitted light through the windows, such matter being carried upon transparent or translucent material. Within the windows are sheets of translucent material, which is preferably a foraminous material, such as fine wire gage, upon which advertising matter is painted or impressed, such matter showing through the windows by reflected light when the interior lights are extinguished, but which are obscured or effaced by the brighter light within when the latter are lighted. I have also provided means for displaying an indicator, such as an initial letter designating the clerk, during the time when the cash receptacle of said clerk is opened, whereby the clerk may be apprised of the operation of his receptacle by a visual indicator as well as by the audible indicator, above referred to.

The above, as well as other objects of the invention, and also the specific mechanisms for carrying the same into effect will more fully appear from the following specification, when taken in connection with the drawings, in which—

Taking up a detailed description of the invention, by reference to the drawings, in which the same reference characters designate the same parts throughout the several views, 1 represents the base of the recorder, 2 the front thereof, 3 the top of the casing proper, and 4 a lid which is hinged to the top 3 at 5 and is supported upon the front 2. Within the casing is a plurality of transverse horizontal partitions 6, 6$^a$, and 6$^c$, dividing the casing into a plurality of horizontal compartments for the cash receptacles, which are shown at A, B, C and D. Any number of such receptacles may be employed, and they may be arranged in any convenient manner, the drawings showing the same arranged in a vertical tier. At the rear of the top 3 and of the said partitions is a vertically extending plate 7, having transverse slots 8 and 8$^a$ therein above the top 3. Parallel with the plate 7 and spaced therefrom, so as to form an advertising chamber is the back plate 9, said plate resting upon the rear end of the base and having transverse slots 10, 10$^a$, and 10$^b$ therein. The upper edges of the plates 7 and 9 are connected by members 11, 12 and 13, the members 11 and 13 being preferably placed at an angle, for the purposes hereinafter set forth.

Toward its front edge the lid or cover 4 is provided with a plurality of rectangularly shaped openings 14, 14$^a$, etc., there being a number of said openings corresponding with the number of the cash drawers or receptacles. Secured to the under side of the lid so as to partially close the openings 14, etc., are plates 15 of transparent material, said material being preferably glass. This glass terminates a short distance to the rear of the front edge of the openings so as to leave narrow slots 16 through which the clerks may write with a pencil or with other suitable means upon their record strips A', A$^2$, A$^3$ and A$^4$. These strips are supported beneath the lid 4 by a table 17, which is mounted upon uprights 18 and 19 so as to form a transverse compartment 20 above the partition 6.

The record strips are independently operated and are consequently carried by independent spools or rollers, there being a pair of such spools for each strip. Each strip is initially carried upon its front spool, which is journaled in slotted bearings 21 that are secured to the partition 6, the slots 22 in the bearings permitting the spool with its roll of paper to be lifted bodily out of the machine. In arms 23, projecting from the bearings 21, I journal a guide-roller 24, over which the paper strip is carried, said guide-roller being substantially on the same plane with the table 17. At its rear end, the paper is led over a similar guide-roller 25 that is journaled in arms projecting from the rear journal brackets 26, said brackets carrying the receiving spools for the strips, to which spools the rear end of the strips are secured. The paper is drawn over the table by the receiving spools, which are rotated a short distance each time their respective cash receptacles are opened and closed, through sets of mechanism now to be described.

Figures 1, 3, 4, 17, 19, 20:
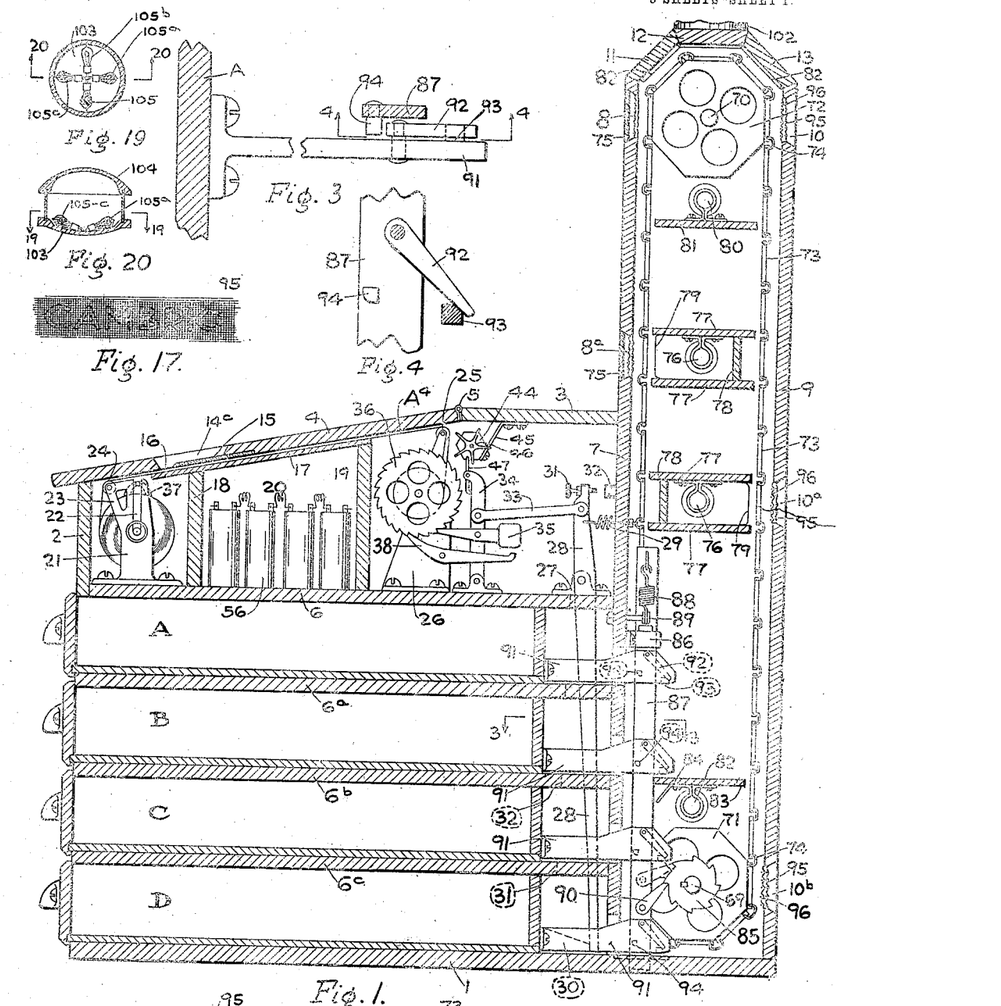
Figure 1 is a vertical sectional view through the recorder taken on the line 1—1 of Fig. 2, the lid register being omitted.
Fig. 3 is a detailed view, taken on the line 3—3 of Fig. 1, and showing the mechanism for operating the advertising belt.
Fig. 4 is a view of a section taken on the line 4—4 of Fig. 3.
Fig. 17 is a front elevation of one of the stationary signs as the same appears when the light at the rear is extinguished.
Fig. 19 is a horizontal section taken through to the drawer indicator and Fig. 20 is a vertical section through Fig. 19 on the line 20—20.

Pivoted in brackets 27 on the partition 6, and projecting downwardly through said partition, is a lever 28 having a spring 29 tending to force the lower end of the lever forwardly when its corresponding cash receptacle is opened. The various mechanisms for operating the several receiving spools from their respective cash receptacles are substantially duplicates, and I shall describe merely the mechanism that is shown in Fig. 1, which is appropriated by clerk D, being operated by drawer D and feeding the strip A$^4$, which belongs to Clerk D.

On the rear end of drawer D I secure a lug or projection 30, which engages with the lower end of the lever 28 and maintains the same in its rearward position, placing the spring 29 under tension. When said receptacle is released, it is thrown open by a spring 31, (see Fig. 2,) in the usual way, the lower end of the lever 28 following the lug or projection 30. In the case of the lower drawer, shown in Fig. 1, the said lever 28 extends through slots in all of the various partitions 6 to 6$^c$ inclusive, while the corresponding lever for drawer C terminates above the partition 6$^c$, the lever for drawer B terminates above the projection 6ᵇ, while the lever for the upper drawer terminates above the partition 6ᵃ, and each of said levers being provided with a spring 29 and being held backwardly by a lug 30 on its respective cash drawer. As stated, when the drawer D opens, the lever 28 swings forwardly; and this movement continues until it is arrested by the engagement of an adjusting screw 31 in the upper end of said lever with a stationary stop 32 on the plate 7 of the casing. By adjusting the screws 31, the extent of movement of the levers may be regulated.

The upper end of the lever 28 is connected, through a link 33, with a rocking pawl carrier 34, having pivoted thereto near its middle, a weighted pawl 35. This pawl is adapted to engage with and turn a ratchet wheel 36 on the end of the receiving reel or spool for the corresponding record strip. As the upper end of the lever 28 swings rearwardly upon the opening of the corresponding cash receptacle, the pawl 35 is drawn backwardly the distance of one tooth on the ratchet wheel 36, and, when the drawer is closed, this pawl is moved forwardly to its normal position, thus turning the receiving reel or spool and causing the record strip to move rearwardly so as to present a fresh surface at the writing slot 16 in the lid 4.

In order to hold the record strip taut, I mount in the slots 22, in the bearings 21, a weight 37 that rests by gravity upon the supply roll and thus resists the rotation of the supply reel or spool. The backward rotation of the ratchet wheel 36 is prevented by a detent pawl 38 that is pivoted upon the journal bracket 26 in position to engage with the teeth on the ratchet. The rear end of each of the pawls 35 and 38 is weighted so as to hold their forward ends in engagement with the ratchet teeth. The pawl 38 projects rearwardly under the weighted end of the pawl 35, whereby, by lifting the rear end of the said pawl 38, both pawls will be disengaged from the ratchet wheel so that the latter may be turned backwardly in case it is desired to inspect a greater length of the record strip than is exposed in front of the roller 25. The opening 14ᶜ in the lid 4 is wide enough from front to rear to expose for instant inspection under the glass 15 four or five of the transactions last recorded. When the proprietor desires to inspect the records for the day's business, the lid 4 is lifted and the record strip extending to the roller 25 is exposed. If this part of the strip does not contain the record for the entire day, the pawl 38 may be lifted to free the ratchet wheel 36, when the strip A⁴ may be moved forwardly any desired distance.

The lid 4 is intended to be locked in its closed position and to thus be kept under control of the proprietor so that no one else may gain access to the record strips. In order that the proprietor may be able to ascertain if anyone else has opened the lid without authority, I provide a special lid register 39 which is supported upon a bracket 40 on the interior of the front 2 of the casing (see Fig. 14). This register is preferably of the ordinary cyclometer type that is operated by a star wheel 41 on the central shaft, said star wheel turning the register wheels when it is rotated in one direction but being incapable of moving the wheels when rotated in the opposite direction. For turning the star wheel, I attach to the under side of the lid 4 a bracket arm 42 having a pivoted by-pass pawl 43, said pawl turning on its pivot when the lid is closed without rotating the star wheel but becoming rigid with respect to its pivot when the lid is opened and thereby causing the register to add one.

The proprietor may also be desirous of ascertaining how many sales have been made by each of his clerks, the number of sales being an index to the efficiency of the clerk. I have therefore provided a special register 44 for each of the record strips, said register being of the same type as the register 39 and being supported by bracket arms 45 from the under side of the top part 3 of the casing. The star wheel 46 of each of these registers is operated by a by-pass pawl 47 that is carried on the upper end of the corresponding pawl carrier 34. By this construction, the register will indicate each time its respective cash receptacle is opened, and the proprietor may read the same when the lid is lifted.

Figures 2, 5, 6, 7, 8:
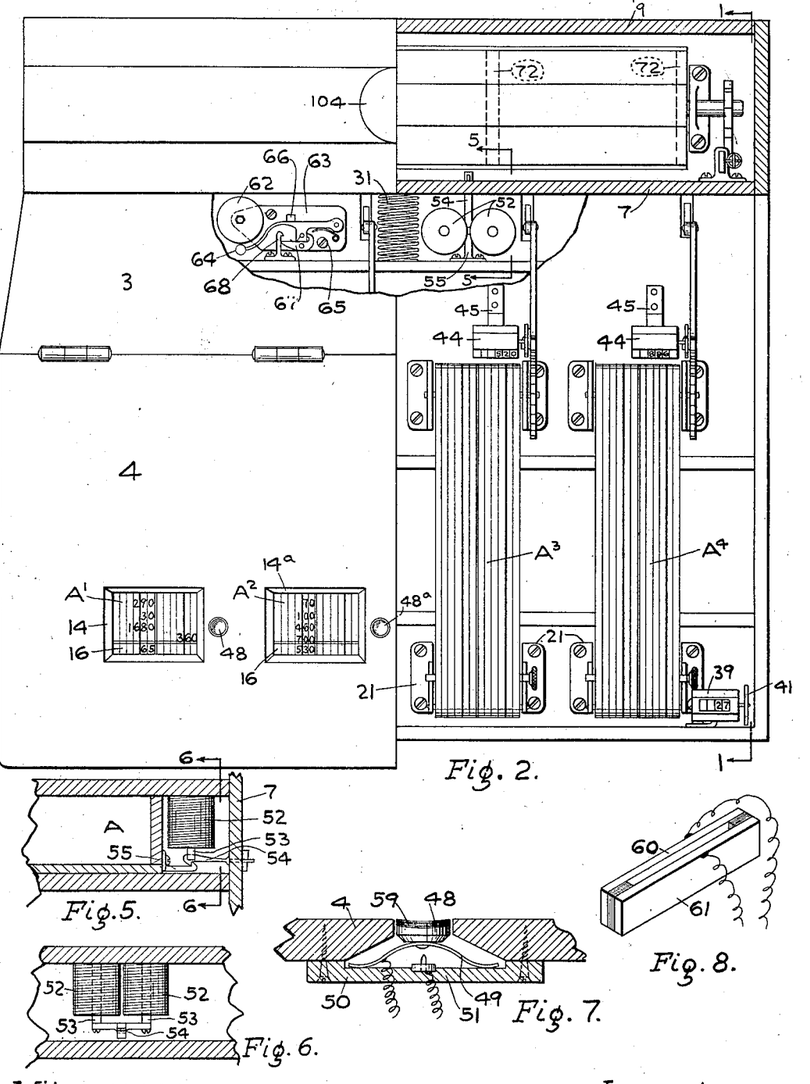
Fig. 2 is a plan view of the recorder, partly in section and partly in elevation, the right hand side of the casing being removed in order to show the parts beneath.
Fig. 5 is a view showing in elevation the mechanism for releasing a cash drawer.
Fig. 6 is a sectional view, taken on the line 6—6 of Fig. 5.
Fig. 7 is a detail view of one form of the contacts for releasing a cash receptacle.
Fig. 8 is a detail view of a modified form of contact device for releasing a cash receptacle.

As appears from Fig. 2, each of the record strips is ruled longitudinally and is divided at its center so as to afford a double strip, on one side of which central division the clerk may record transactions of one character, and, on the opposite side, transactions of a different character. Thus the strip A' shows on its left hand side four different items which may represent cash transactions, and on its right hand side, it shows one transaction which may represent cash that has been paid out. The strips may be further subdivided so as to represent other kinds of transactions, such as moneys received on account, or moneys charged to account, or cost of article sold, etc.

Figures 11, 12, 13, 14, 15, 16:
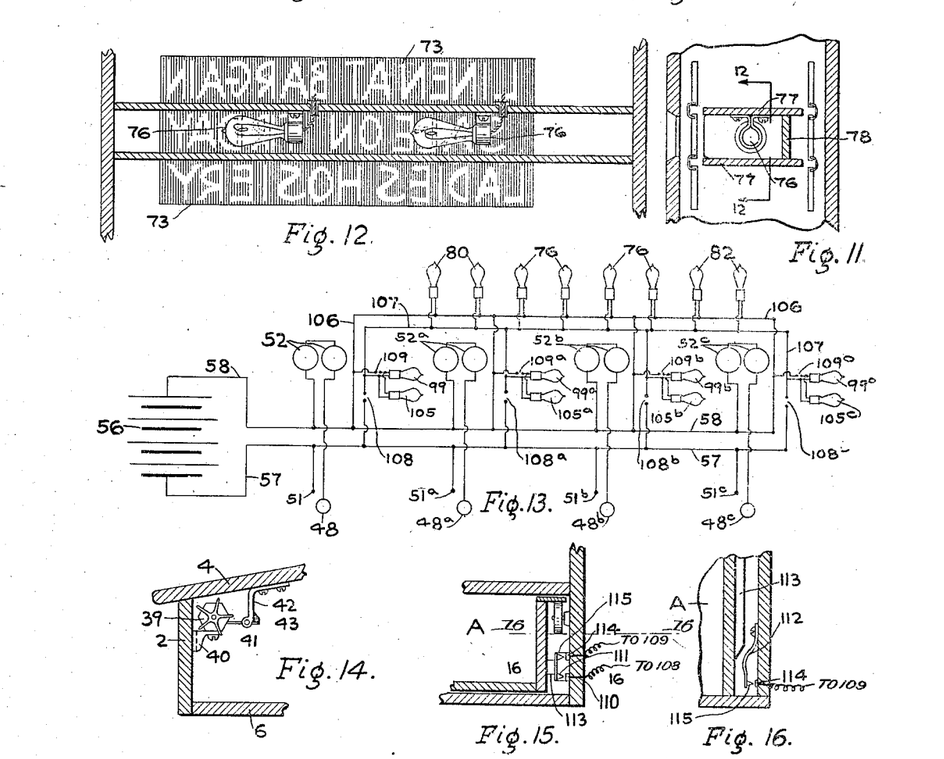
Fig. 11 shows a section of the advertising belt and the casing with the interior arrangement of parts for causing the belt to be illuminated.
Fig. 12 is a section on the line 12—12 of Fig. 11.
Fig. 13 is a diagrammatic view showing the electrical conections for releasing the drawers for illuminating the advertising matter and the clerks' indicators.
Fig. 14 is a detail view showing the special register for the lid of the casing.
Fig. 15 is a detailed view showing a front elevation of the drawer controlled contacts.
Fig. 16 is a sectional view taken on the line 16—16 of Fig. 15.

After a clerk has recorded a transaction on his strip, it is necessary for him to release his cash-drawer and close the same again in order to feed his record strip so as to present a fresh portion thereof at the slit 16 for the next transaction. While the several cash drawers may be released by mechanical means, I prefer to control the release of the same through electrical circuits which are so arranged with respect to the several record strips that, after recording a transaction, the clerk may simply close a contact adjacent his record strip and thereby release his drawer to the exclusion of all of the other drawers. As appears in Fig. 2, I mount in the lid 4 just to the right of the openings 14, 14ª, etc., push buttons 48, 48ª, etc., said buttons being secured to a spring contact 49, (see Fig. 7) that is supported upon a plate 50 on the under side of the lid 4, the buttons being held by springs in a position substantially flush with the upper surface of the lid. Upon the plate 50, and insulated therefrom, is a contact 51, said contact being in position to be engaged by the contact spring when the button is depressed and thus close an electric circuit. At the rear of each of the cash drawers and supported from the partition plate just above the same, I place a pair of solenoid coils 52, having solenoid plungers 53 that are connected to a hook 54, said hook being carried by the vertical frame plate 7. On the rear of each of the cash drawers, I secure a hook 55, which hook is adapted to be engaged by the hook 54 when the drawer is in its closed position, whereby the drawer is held upwardly against the tension of its spring 31. When, however, the solenoids are energized, the cores 53 are drawn inwardly, thereby lifting the hook 54 and releasing the drawer. The solenoids for the various cash drawers are energized from a single source of energy, such as a battery 56, that is preferably contained in the chamber 20 beneath the writing table 17. The circuits for the solenoids is shown in Fig. 13, to which attention is now directed, and in which 56 represents the battery, to which is connected the lead wires 57 and 58. 48, 48ª, 48ᵇ and 48ᶜ represent the push buttons, hereinbefore described, of the various clerks, which buttons control the circuits for the solenoids 52, 52ª, 52ᵇ, and 52ᶜ, for the respective cash receptacles A, B, C and D.

When the circuit is closed between the button 48 and the contact 51, the current from the battery will flow through the solenoids 52 of drawer A, thereby releasing said drawer. No current can flow through the remaining solenoids, for the reason that their push buttons are not depressed. Similarly, when button 48ª is depressed, the solenoid 52ª will be energized to release drawer B, but none of the other drawers will be released. When each clerk completes writing his record, his hand is in position to immediately depress his respective button, which depression results in opening his respective cash drawer to the exclusion of all other drawers. The button may be depressed by the finger of the operator, or he may depress the same through his lead pencil, the buttons being preferably covered with a soft pad 59 to prevent the breaking of the lead in the pencil.

In Fig. 8, I have shown a modified form of contact in which no push button is employed, the same consisting of two parallel contact plates 60 and 61 which are insulated from each other and are so closely spaced that the circuit may be established between the plates by simply inserting the point of the lead pencil therebetween, the lead of the pencil serving as a conductor. It being understood that the clerk in making his record has his pencil in hand, the operation of closing the circuit by inserting the point of his pencil between the contacts 60 and 61 may be very rapidly performed, and the speed of operation of the machine is thus made very rapid.

As each clerk is held individually responsible in case the cash in his money receptacle fails to properly tally with the record on his strip, I have provided an audible signal for each cash drawer, each of which is sounded when its respective cash drawer is opened, and in order that each clerk may distinguish his own signal from the others, I prefer to give each signal some characteristic sound or tone, which shall be loud enough to be heard by the clerk when some distance from the machine. These signals preferably consist of bells or gongs, one of the same being shown at 62 in Fig. 2. This bell is preferably mounted upon a frame 63 that is secured to the partition immediately below its respective drawer, the bell being sounded by a hammer 64 that is pressed by a spring 65 against a stop 66 on the frame 63. To an arm on the hammer lever I pivot a by-pass pawl 67, said pawl being adapted to be engaged by a hook 68 on the rear end of its respective cash drawer. When the drawer is thrown outwardly by its spring 31, the hook 68, engaging with the pawl 67, swings the hammer lever forwardly, against the tension of its spring 65, until the pawl escapes from the hook, when the spring throws its hammer lever backwardly against the stop 66. The resiliency of the hammer lever permits the hammer to continue its motion a distance sufficient to strike the bell or gong 62.

Mounted on shafts 69 and 70 at the rear of the machine and in the bottom and top respectively of the advertising chamber, are sets of disks 71 and 72 respectively, of irregular outline, the drawings showing said disks as octagonal in form, although the number of faces on the edges of these disks would be varied according to the width of the advertising plates 73, which plates are connected by links 74 so as to form an endless belt passing over the said disks. This belt stands in a vertical direction at the rear of the cash drawers, and the plates thereon are adapted to be viewed through the windows 8, 8ª, 10, 10ª and 10ᵇ in the casing. While the plates 73 may be wide enough to contain two lines of advertising matter, reversed with respect to each other, so that one of said lines would read correctly from the rear of the machine, and the other line read correctly from the front thereof, the drawings show but one line of advertising matter on each plate which if arranged to read properly from the rear, will obviously read incorrectly from the front. I have therefore shown the front windows 8 and 8ª closed by plates or plugs 75, the rear windows being opened and the advertising matter on the belt being so placed as to read properly through these windows, it being understood that the machine would usually be so placed as to have the rear windows toward the customer. If, however, it be desired to turn the machine so that the front thereof is toward the customer, the plates or plugs 75 would be placed in the rear windows, instead of in the front.

As shown in Fig. 12, I prefer to make the letters on the plates 73 transparent, surrounded by an opaque background, the letters being caused to appear by interior lights 76 which are placed behind the belt, said lights being preferably inclosed on three of its sides by horizontal partition boards 77 and a vertical partition board 78. For diffusing the light behind the plates, I prefer to stretch a piece of translucent material 79 between the boards 77, separating the lights and the advertising belt, said translucent material being preferably some thin cloth. The lamp 80 near the top of the machine is supported upon a partition plate 81 below the same, and the light from said lamp is projected through the windows 8 or 10, by reflectors 82 on the interior of the members 11 and 13 at the top of the casing. The lower light 82 illuminates the lower part of the casing, being supported upon a partition plate 83, and having its light projected toward the window 10ᵇ by a reflector 84 that is supported from the said plate 83.

The shaft 69 with its disks 71 is turned intermittently each time a cash receptacle is closed so as to present a new advertising plate 73 at the windows. For accomplishing this result, I secure to the shaft 69 a ratchet wheel 85 which is provided with as many ratchet teeth as there are faces on the edges of the disks 71. Guided in brackets 86 on the rear of the frame 7 is a vertically reciprocating bar 87, said bar being normally maintained in its lowermost position by a spring 88 which is attached to said bar near its upper end and to a stud 89 that projects from the frame 7. The bar 87 carries near its lower end an operating pawl 90 that is adapted to engage with the teeth of the ratchet wheel 85, so that when the bar is lifted the shaft 69 is rotated a distance sufficient to move the belt so as to present a new advertising plate thereon in front of the windows.

Projecting from the rear end of each of the cash drawers is a member 91, said member having pivoted thereto a by-pass cam-pawl 92 (see Fig. 3), which pawl normally rests upon a laterally extending lug 93 on the member, being maintained by said lug so as to incline downwardly and rearwardly. Projecting from the side of the bar 87, adjacent to the member 91, is a lug 94, there being one of said lugs for each of the members 91. These lugs are so placed that, when the parts are in normal position, as shown in Fig. 1, the lugs are in front of the vertical line through the pivots of the cam-pawls 92 and above the paths of movement of the lugs 93. With this construction, it will be seen that when a cash drawer is opened its corresponding lug 93 will pass below the lug 94, while the latter lifts the cam-pawl 92 freely, said pawl dropping to normal position on its lug 93 as the drawer continues its outward movement. As the drawer is pushed inwardly, however, the rear inclined face of the cam-pawl engages with the lug 94 and thereby lifts the bar 87 a distance sufficient to cause its pawl 90 to turn the ratchet wheel 85 one space, or through the length of one tooth. Before the drawer comes to rest, the lug 94 passes over the top of the cam pawl and drops down to normal position, ready to be again operated when another drawer is released, and is again closed. If desired, a full stroke mechanism for the drawers may be employed so as to prevent the latter from being opened but part way and again closed. Since such mechanisms are common in the art, it is not deemed necessary to show the same herein.

Figure 18:
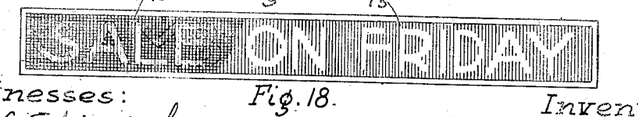
Fig. 18 shows part of the same sign as it appears when the interior light is burning, part of the said sign being broken away to show more clearly the movable sign at the rear thereof.

The effectiveness of an advertisement is dependent largely upon its ability to attract attention, and I desire to so construct my invention as to change the indications and the characters of the indications frequently. As has been stated, the plates 73, of the belt are preferably formed on transparent or translucent material with the characters showing through an opaque background, when the interior lamps are lighted. When these lamps are extinguished, I prefer to cause the advertising matter on the belt to disappear while another advertisement is brought into view. For this purpose, I place within the windows 8, 8ª, 10, 10ª, and 10ᵇ, a sheet of translucent material 95, which carries an advertisement, said advertisement appearing by reflected light when the interior lights are extinguished, but which is substantially effaced by the brighter interior lights shining through the transparent advertising matter on the plates 73. In Fig. 17, I have shown a portion of one of the sheets 95, as the same appears by the reflected exterior light of the room, while in Fig. 18, I have shown part of the same sheet as it appears when the interior lamps are lighted, from which it will be seen that the advertisement of Fig. 17 is substantially obliterated while the advertisement on the plates 73 stands out plainly. The sheets 95 are preferably made of a fine mesh of wire netting; and, for the purpose of more completely obscuring the advertisement on the belt when the interior lights are extinguished, I prefer to place in the windows behind the sheets 95 a similar sheet 96. By this construction, the outer sign will normally appear, while the signs on the belt will appear when the interior lamps are lighted.

Figure 9:
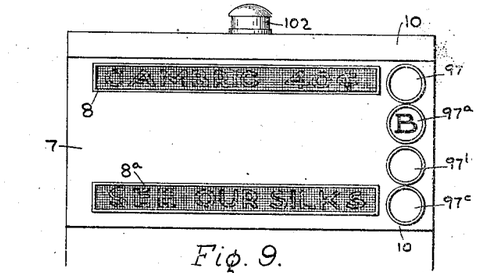
Fig. 9 is a front view of the upper portion of the casing containing the advertising belt and also the clerks' indicators.
Figure 10:
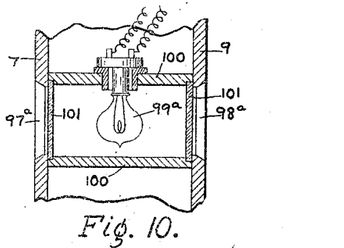
Fig. 10 is a section through a portion of the structure shown in Fig. 9, taken on the line 10—10 thereof, and showing the means for lighting up a clerk's initial indicator.

In addition to the audible signals for the cash drawers hereinbefore described, I desire to provide a visible indicator for each of said drawers which shows to the customer, the operating clerk, and also to anyone else within sight, of the machine what drawer has been opened. For this purpose, I provide in a convenient place, on the machine, as on the right hand side of the upwardly projecting portion of the advertising chamber casing, a series of front windows 97, 97$^a$, 97$^b$, and 97$^c$, and a corresponding series of rear windows, one of the same being shown in Fig. 10, and designated 98$^a$, the window 98$^a$, being directly at the rear of the window 97$^a$ so that both of said windows may be lighted by the same light 99$^a$ that is inclosed within a casing 100, said casing being open at each of its ends so that the light from the lamp can issue from said chamber only through the windows at the ends thereof. These windows are closed by plates 101 which carry some characters designating the operating clerk, or the drawer which is appropriated by said clerk, said characters preferably being initial letters, as shown in Fig. 9, in which the initial "B" is caused to appear, the lamp behind the same being lighted, and the other lamps for the other windows being extinguished. These character signs are intended to show to the customer and to the clerk or clerks in front of the machine what drawer is opened, or what clerk has made the sale. Unless a person is standing either in front of or in the rear of the machine, he will not be able to see the letters through these windows; and, it may happen that one of the clerks is at some distance from the machine, when he hears one of the bells or gongs ring, as the machine is operated. In order that this clerk may ascertain from a distance if his cash drawer has been fraudulently opened, I provide an indicator 102, which is adapted to be illuminated each time a drawer is opened and to show a characteristic color for each cash drawer, said indicator being shown in detail in Figs. 9, 19 and 20. From these figures, it will be seen that I provide a circular belt of transparent or translucent material which rests upon the center of the member 12 of the casing. Below this belt I provide a saucer shaped reflector 103, and above the belt, a similar inverted reflector 104. Within the reflector 103, I place lamps 105, 105$^a$, 105$^b$, 105$^c$, corresponding in number with the numbers of the cash drawers, and differing in color from one another so that when the cash drawer is opened, the lamp 105 controlled thereby is lighted, thereby exhibiting a light having a color indicating which drawer is operated.

The various lamps hereinbefore described are lighted by a current that is furnished from the battery 56 that furnishes the current for the drawer releasing solenoids, hereinbefore described, through the connections shown in Figs. 13, 15 and 16. In these figures 106 is a conductor that is connected with the leadwire 58, and 107 is a similar conductor that is connected with the lead wire 57, the lamps 76, 80 and 82 for the advertising belt being placed in parallel across these conductors. The conductor 107 is broken at points 108, and 108$^c$, while cross conductors between the same are broken at corresponding points 108$^a$, and 108$^b$. The clerk's lamps 99, 99$^a$, 99$^b$, 99$^c$ are likewise arranged so as to be in parallel with the conductors 106 and 107, but their connections are broken at points 109, 109$^a$, 109$^b$, and 109$^c$. The lamps 105, 105$^a$, 105$^b$, 105$^c$, are in parallel with the clerk's lamps just referred to. The contact points 108 and 109 are controlled by drawer A; the contact points 108$^a$ and 109$^a$ are controlled by drawer B; the contact points 108$^b$ and 109$^b$ are controlled by drawer C; while the contact points 108$^c$ and 109$^c$ are controlled by drawer D. The means for controlling these sets of contacts are identical on the several drawers, and that shown in Figs. 15 and 16 will suffice for all, it being assumed that these figures show drawer A.

The wires leading to the points 108 are connected to a stationary contact 110 on the casing at the side of the drawer and to a movable contact 111 that is carried on the spring arm 112, also secured to the side of the casing. On the drawer A is a cam projection 113 which terminates with a rounded end just to the rear of the spring 112 when the drawer is in its closed position. When, however, the drawer is opened for any substantial distance, the spring 112 is forced outwardly so as to carry the point 111 into contact with the point 110 thereby closing the circuits through these points. Similarly the wires leading to the contact points 109 are connected to a stationary contact point 114, and to a movable contact point 115, said contact points being mounted respectively on the casing and on the spring 112, so that the opening of the drawer results in closing these contacts at the same time that the contacts 108 are closed.

From the above description, it will be understood that when the button 48 for drawer A is depressed, and that drawer is opened, that contacts at the points 108 and 109, see Fig. 13, are closed, with the result that the lamps for the advertising belt, the lamp 99, and the lamp 105 are lighted, the remaining lamps being unlighted for the reason that their circuits remain broken. Similarly, when the button 48ª is depressed and cash drawer B is opened, the contacts at 108ª and 109ª are closed, which again light up the lamps for the advertising belt, and also light the lamps 99ª and 105ª, and so on. Whenever any drawer is opened therefore, its corresponding clerk's lamp, its corresponding signal lamp, for the indicator 102, and all of the lamps for the advertising belt are lighted, and remain lighted while the cash drawer is open. When, however, the cash drawer is closed, its cam-projection 113 passes beyond the spring 112 so that the contacts are broken and all lights are extinguished.

While I have necessarily shown numerous details in this application, I desire it to be understood, that the following claims are not intended to be limited to such details any further than is necessary by the specific terms therein.

Having thus described my invention, I claim:

1. In a cash recorder, a plurality of independently operated pairs of reels or spools carrying record strips, there being a record strip for each clerk using the recorder, a ratchet wheel on one of the reels or spools of each pair, a plurality of cash safes corresponding in number to the said ratchet wheels, levers independently operated by the respective cash safes, pawls operated by the respective levers for turning their respective ratchet wheels when a cash safe is operated, and a register for and operated from each of said levers for showing the number of times each strip has been moved.

2. In a cash recorder having a plurality of clerks' record strips, a plurality of normally locked cash safes corresponding in number with the record strips, electro-magnetic mechanism for releasing the cash safes, a source of electrical energy, electrical conductors connecting the source of electrical energy with the electro-magnetic mechanisms, said conductors being broken at points adjacent the record strips, means for closing said conductors whereby any cash safe desired may be released to the exclusion of all other cash safes, and means for feeding the record strips when their respective cash safes are operated.

3. In a cash recorder having a plurality of clerks' record strips, a plurality of normally locked cash safes corresponding in number with the record strips, electro-magnetic mechanism for releasing the cash safes, a source of electrical energy, electrical conductors connecting the source of electrical energy with the electro-magnetic mechanisms, said conductors being broken at points adjacent the record strips, means for closing said conductors whereby any cash safe desired may be released to the exclusion of all other cash safes, means for feeding the record strips when their respective cash safes are operated, and registers connected with said feeding means for showing the number of times each strip has been moved.

4. In a cash recorder having a plurality of clerks' record strips, a plurality of normally locked cash safes corresponding in number with the record strips, a source of electrical energy, conductors leading from said source of electrical energy, electro-magnetic mechanisms for releasing the cash safes, said mechanisms being connected in parallel across the said conductors by open circuits, means for closing any of said open circuits for operating the respective electro-magnetic mechanisms, whereby any cash safe may be unlocked to the exclusion of the other cash safe, a register for each of said safes for showing how often the same has been operated, and means for feeding the record strips singly when their respective cash safes are operated.

5. In a cash recorder having a plurality of clerks' record strips, a plurality of normally locked cash safes corresponding in number with the record strips, means for moving each record strip when its corresponding cash safe is operated, a source of electric energy, electro-magnetic mechanisms for releasing the respective cash safes, and an illuminating indicator operated from the source of electric energy when a cash safe is moved from its normal position for indicating from a distance what safe has been operated.

6. In a cash recorder having a plurality of clerks' record strips, a plurality of normally locked cash safes corresponding in number with the record strips, means for moving each record strip when its corresponding cash safe is operated, a source of electric energy, electro-magnetic mechanisms for releasing the respective cash safes, an illuminating indicator operated from the source of electric energy when a cash safe is moved from its normal position for indicating from a distance what safe has been operated, and a clerks' indicator for showing what clerk has operated the recorder.

7. In a cash recorder having a plurality of clerks' record strips, an indicator for each of said strips, mechanisms for independently feeding said strips after a transaction has been recorded thereon, electric means for controlling said mechanisms and an electric indicator for indicating the clerk making the record.

8. In a cash recorder having a plurality of clerks' record strips, mechanisms for feeding said strips independently after a transaction has been recorded thereon, a source of electrical energy, electro-magnetic mechanisms operated from said source for controlling the feeding mechanisms and for determining which strip shall be fed, and an electric indicator for showing what clerk has operated the recorder.

9. In a cash recorder having a plurality of clerks' record strips, mechanisms for feeding said strips independently after a transaction has been recorded thereon, a source of electrical energy, electro-magnetic mechanisms operated from said source for controlling the feeding mechanisms and for determining which strip shall be fed, an electric indicator for showing what clerk has operated the recorder, and a register for each record strip for showing the number of transactions recorded thereon.

10. In a cash recorder having a plurality of clerks' record strips, means for feeding said strips independently after a transaction has been recorded thereon, a source of electrical energy, electro-magnetic mechanisms operated from said source for controlling the feeding means and for determining which strip shall be fed, said mechanisms being arranged in parallel in a circuit from the source of energy, means for closing the circuit through any one of the said mechanisms, and an electric indicator for showing which one of said mechanisms has been operated.

11. In a cash recorder having a plurality of clerks' record strips, means for feeding said strips independently after a transaction has been recorded thereon, a source of electrical energy, electro-magnetic mechanisms operated from said source for controlling the feeding means and for determining which strip shall be fed, said mechanisms being arranged in parallel in a circuit from the source of energy, means for closing the circuit through any one of the said mechanisms, an electric indicator for showing which one of said mechanisms has been operated, and a register for each record strip for showing the number of transactions recorded thereon.

12. In a cash recorder having a plurality of clerks' record strips, independent means for feeding said strips, an advertising belt formed of a plurality of non-opaque plates, a source of electric energy, and connections with said source of energy for controlling the feeding of said strips and for causing the advertising matter on said plates to appear.

13. In a cash recorder having a plurality of clerks' record strips, independent means for feeding said strips, an advertising belt formed of a plurality of non-opaque plates, a source of electric energy, connections with said source of energy for controlling the feeding of said strips and for causing the advertising matter on said plates to appear, and an electric indicator connected with said source of energy for showing which strip has been fed.

14. In a cash recorder having a plurality of clerks' record strips, there being a strip for each clerk operating the recorder, reels or spools upon which said strips are mounted, a ratchet wheel connected with certain of said reels or spools for turning the latter and feeding the strips, an advertising device having a plate of non-opaque material carrying the advertising matter, a source of electric energy, means for independently turning the several ratchet wheels, electro-magnetic mechanisms connected with the source of energy for controlling the said means, an electric light behind the said plate, and means for closing a circuit from the source of energy to said light when either of the record strips is fed.

15. In a cash recorder having a plurality of clerks' record strips, there being a strip for each clerk operating the recorder, reels or spools upon which said strips are mounted, a ratchet wheel connected with certain of said reels or spools for turning the latter and feeding the strips, an advertising device having a plate of non-opaque material carrying the advertising matter, a source of electric energy, means for independently turning the several ratchet wheels, electro-magnetic mechanisms connected with the source of energy for controlling the said means, an electric light behind the said plate, means for closing a circuit from the source of energy to said light when either of the record strips is fed, and an electric indicator connected with said source of energy for showing which strip has been fed.

16. In a cash recorder having a plurality of clerks' record strips, means for independently feeding said strips, a plurality of cash receptacles corresponding in number with the record strips, connections between each cash receptacle and its corresponding record strip for feeding the latter when the receptacle is operated, an advertising device, and means for operating said device when either cash receptacle is operated.

17. In a cash recorder having a plurality of clerks' record strips, means for independently feeding said strips, a plurality of cash receptacles corresponding in number with the record strips, connections between each cash receptacle and its corresponding record strip for feeding the latter when the receptacle is operated, an advertising device, means for operating said device when either cash receptacle is operated, and indicators under control of the respective receptacles for showing which receptacle is operated.

18. In a cash recorder having a plurality of record strips, a plurality of cash receptacles corresponding in number with the record strips, connections between each of the cash receptacles and its corresponding record strip for feeding the latter when the receptacle is operated, an advertising belt, and means connected with each of the said receptacles for operating the belt as the receptacle is operated.

19. In a cash recorder having a plurality of record strips, a plurality of cash receptacles corresponding in number with the record strips, connections between each of the cash receptacles and its corresponding record strip for feeding the latter when the drawer is operated, an advertising belt, an indicator for each receptacle, and means connected with each of the said receptacles for operating the belt as the receptacle is operated and for controlling its respective indicator.

20. In a cash recorder having a plurality of record strips, a pair of reels or spools for each record strip upon which the strips are wound, a ratchet wheel secured to one of the reels or spools of each pair, a pivoted lever for each of said ratchet wheels, a pawl operated by each of said levers for turning its respective ratchet wheel, a cash drawer for each lever, means on the cash drawers for rocking their respective levers, an advertising belt, and means connected with each of said drawers for operating the belt from any drawer.

21. In a cash recorder having a plurality of record strips, a pair of reels or spools for each record strip upon which the strips are wound, a ratchet wheel secured to one of the reels or spools of each pair, a pivoted lever for each of said ratchet wheels, a pawl operated by each of said levers for turning its respective ratchet wheel, a cash drawer for each lever, means on the cash drawers for rocking their respective levers, an advertising belt, an indicator for each drawer, and means connected with each of said drawers for operating the belt from any drawer and for controlling its respective indicator.

22. In a cash recorder having a plurality of record strips, a plurality of cash receptacles, there being a receptacle for each record strip, means for feeding a record strip when its corresponding receptacle is operated, a source of electrical energy, electro-magnetic mechanisms for determining which receptacle shall be operated, electrical connections from said source of energy to said mechanisms, selective devices adjacent the several record strips for determining which of the said mechanisms shall be energized, an advertising belt formed of plates of non-opaque material, means for turning said belt whenever a cash receptacle is operated, an electric light behind said plates, and means for closing a circuit including the source of energy and said light whenever a cash receptacle is released for causing the advertising matter on said plates to appear.

23. In a cash recorder having a plurality of record strips, a plurality of cash receptacles, there being a receptacle for each record strip, means for feeding a record strip when its corresponding receptacle is operated, a source of electrical energy, electro-magnetic mechanisms for determining which receptacle shall be operated, electrical connections from said source of energy to said mechanisms, selecting devices adjacent the several record strips for determining which of the said mechanisms shall be energized, an advertising belt formed of plates of non-opaque material, means for turning said belt whenever a cash receptacle is operated, an electric light behind said plates, means for closing a circuit including the source of energy and said light whenever a cash receptacle is released for causing the advertising matter on said plates to appear, and a register for each record strip for showing the number of transactions recorded thereon.

24. In a cash recorder, a plurality of independently operated pairs of reels or spools carrying record strips, there being a record strip for each clerk using the recorder, a pawl and ratchet wheel for each record strip and adapted to feed the same, a plurality of cash safes corresponding in number to the said ratchet wheels, levers independently operated by their respective cash safes, connections between the respective levers and their pawls for turning their respective ratchet wheels when a cash safe is operated, and a register for and operated from each of said levers for showing the number of times each strip has been moved.

25. A cash recorder having a plurality of clerks' record strips, a plurality of cash drawers corresponding in number with the record strips, a casing within which said drawers and strips are mounted, said casing having its top formed so as to constitute a writing desk, said top having an opening for each record strip through which opening clerks may write upon their respective record strips, means for moving each record strip from its corresponding cash drawer, and a register connected with said means for showing the number of times each strip has been moved.

26. In a cash recorder having a plurality of clerks' record strips, a plurality of cash drawers corresponding in number with the record strips, a casing within which the said drawers and strips are mounted, said casing having a top so arranged as to constitute a writing desk, and said top having an opening therein for each record strip through which a clerk may write upon his respective record strip, and means for moving each record strip from the corresponding cash drawer.

27. In a cash recorder having a plurality of clerks' record strips, a plurality of cash drawers corresponding in number with the record strips, means for moving each record strip from the corresponding cash drawer, a casing containing the cash drawers and record strips, said casing having a pivoted top through which an opening is formed for each record strip and through which a clerk may write upon his respective record strip, said casing also containing at the rear of the pivoted top and at the rear of the cash drawers a vertically disposed chamber, an advertising device disposed within said chamber, and means for operating said advertising device whenever a cash drawer is operated.

28. In a cash recorder, a casing, a plurality of cash drawers mounted in said casing, each cash drawer having a clerks' record strip associated therewith, means connecting each cash drawer with its respective record strip for feeding the latter when the drawer is operated, an incandescent electric lamp for each cash drawer, the lamps having different and characteristic colors, a source of electric energy, and circuits associated with said drawers and lamps whereby, when a drawer is operated, its respective lamp will be illuminated, thereby exhibiting a color signal showing from a distance which drawer and record strip has been operated.

29. In a cash recorder, the combination with a casing having a plurality of clerks' autographic record strips mounted side by side therein, there being a record strip for each clerk using the recorder, of selective means for causing any desired one of said strips to be operated to the exclusion of the other strips, an electric lamp for each record strip, said lamps having different and characteristic colors, a source of electric energy and circuits associated with the said selective means, the source of electric power and the lamps for causing a lamp to be illuminated whenever its corresponding record strip is operated, whereby there will be exhibited from a distance an indication showing which record strip has been moved.

30. In a cash recorder, the combination with a casing having a plurality of clerks' autographic record strips mounted side by side therein, there being a record strip for each clerk using the recorder, of means for operating each record strip, selective devices for determining which strip will be operated to the exclusion of the other strips, an electric lamp for each record strip, said lamps having different and characteristic colors, a source of electric power, and electric circuits including the said source of power, the electric lamps and the selective devices, whereby, when any selective device is operated, its respective record strip will be caused to move and its respective lamp will be lighted to indicate which strip has been moved.

31. In a cash recorder, the combination with a casing having a plurality of clerks' record strips therein, there being a record strip for each clerk using the recorder, of means for feeding each individual record strip independently of the others, a series of selective devices, an electric lamp for each of the record strips, said lamps having different and characteristic colors, a reflector on which said lamps are mounted, a belt of transparent or translucent material surrounding said lamps above the reflector, an inverted reflector resting upon said belt above the lamps, a source of electric energy, and circuits including the said source of energy, the said selective devices and the said lamps, whereby, when any selective device is operated, its corresponding record strip is placed in condition for feeding and the corresponding lamp will be lighted, thus exhibiting at a distance an indication showing which record strip has been fed.

32. In a cash recorder, the combination with a casing, of a plurality of cash drawers in said casing, there being a cash drawer for each clerk using the recorder, means for locking each drawer in its closed position, a series of selective devices, one for each drawer, electro-magnetic devices for unlocking each drawer, an electric lamp for each drawer, said lamps being of different and characteristic colors, a source of electric power, and circuits including said source of power, said electro-magnetic devices, said lamps and said selective devices, whereby, upon the operation of any selective device, its respective electro-magnetic device will be operated and its respective lamp will be lighted so as to exhibit a color indicating which drawer is being operated.

33. In a cash recorder, the combination with a casing having a plurality of clerks' record strips therein, of a plurality of cash drawers, there being a record strip and drawer for each clerk using the recorder, means associated with each drawer and its respective record strip for feeding the latter when the drawer is operated, a series of selective devices, one for each drawer, a series of electro-magnetic mechanisms for controlling the several cash drawers, an electric lamp, one for each cash drawer, said lamps having different and characteristic colors, a source of electric power, and circuits including said source of power, said electro-magnetic mechanisms, said lamps and said selective devices, whereby, when any selective device is operated, the corresponding electro-magnetic mechanism will be actuated to render its respective drawer operative and the corresponding lamp will be illuminated, thereby exhibiting a colored light showing which drawer is being operated.

In testimony whereof, I hereunto affix my signature in the presence of two witnesses.

PERRY A. McCASKEY.

Witnesses:
 S. E. FOUTS,
 A. J. HUDSON.